Figure 1:
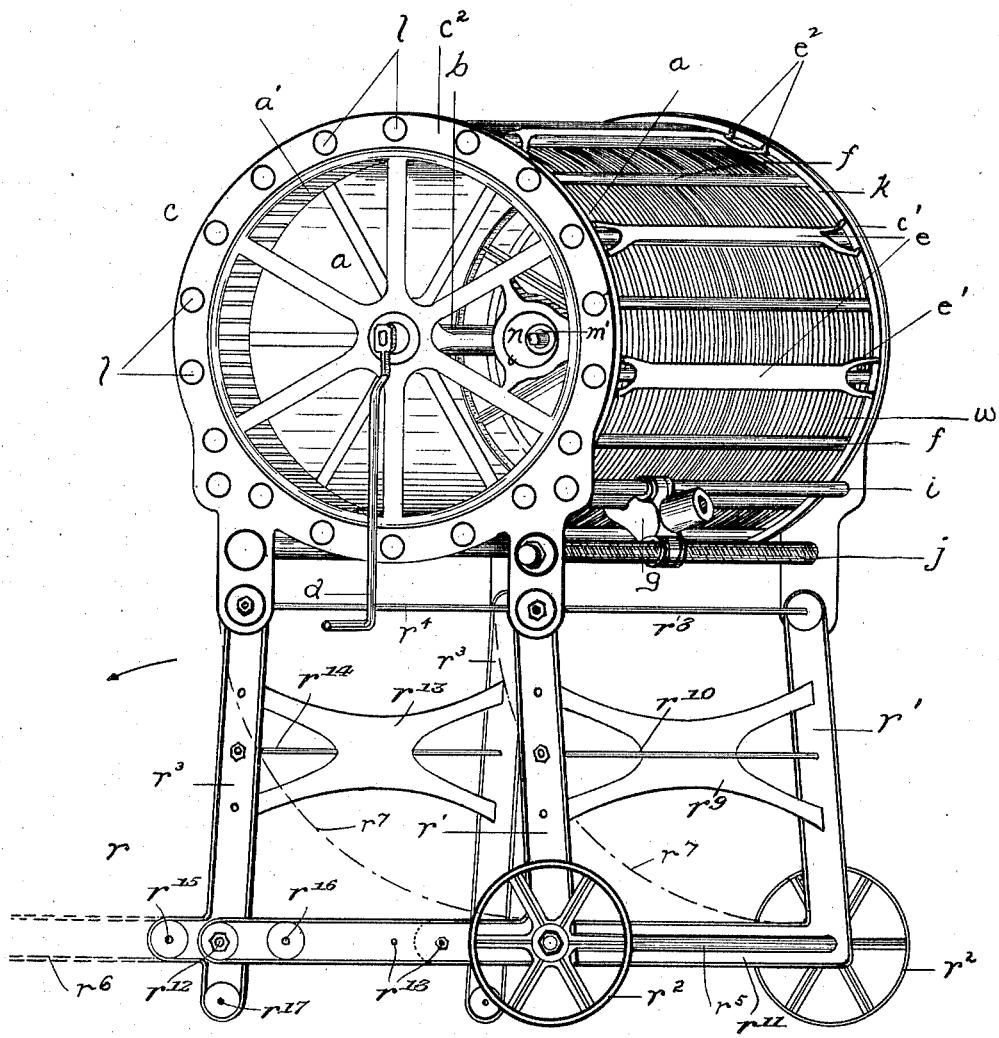

G. FUSSELL.
CONDUIT WIRE FISHING REEL.
APPLICATION FILED JAN. 2, 1912.

1,096,618.

Patented May 12, 1914.
5 SHEETS—SHEET 1.

WITNESSES:

INVENTOR
George Fussell
BY
ATTORNEY

G. FUSSELL.
CONDUIT WIRE FISHING REEL.
APPLICATION FILED JAN. 2, 1912.
1,096,618.
Patented May 12, 1914.
5 SHEETS—SHEET 2.
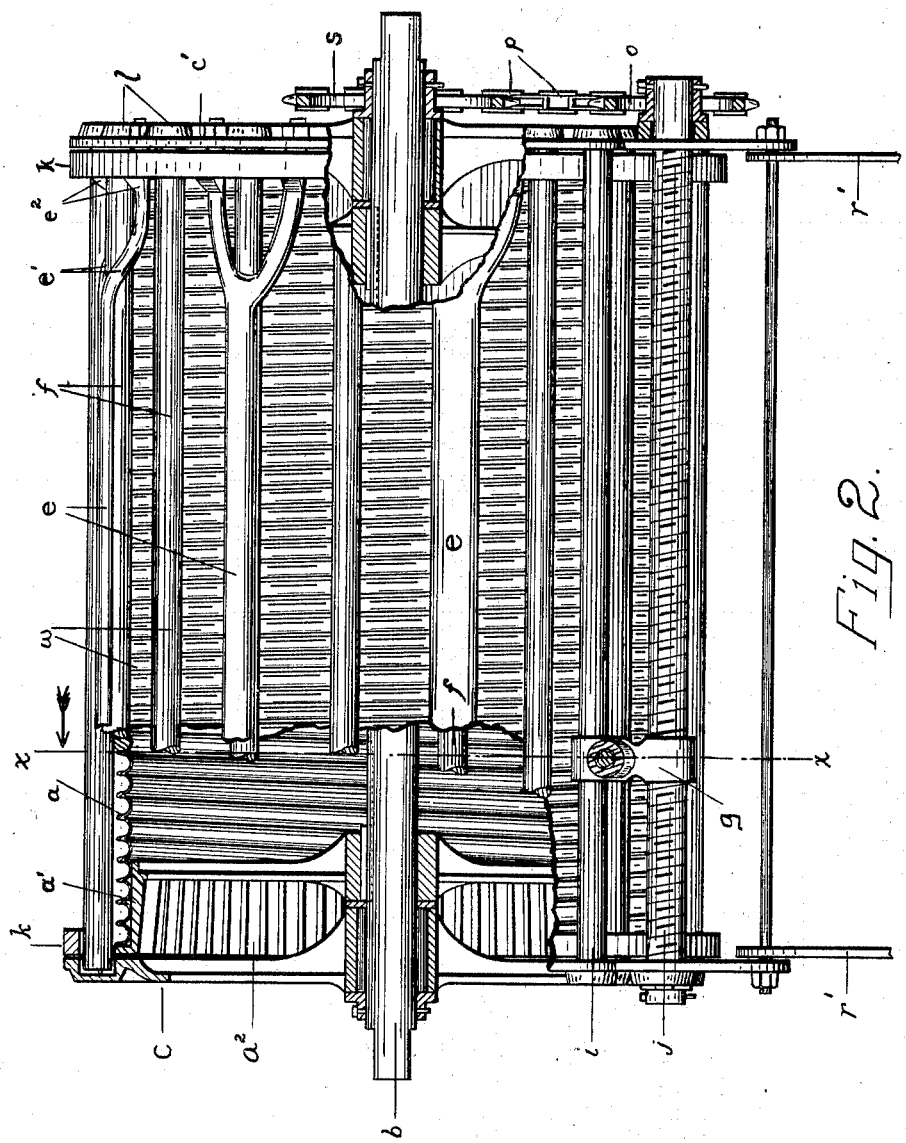
WITNESSES:
INVENTOR G. FUSSELL.
CONDUIT WIRE FISHING REEL.
APPLICATION FILED JAN. 2, 1912.
1,096,618.
Patented May 12, 1914.
5 SHEETS—SHEET 3.
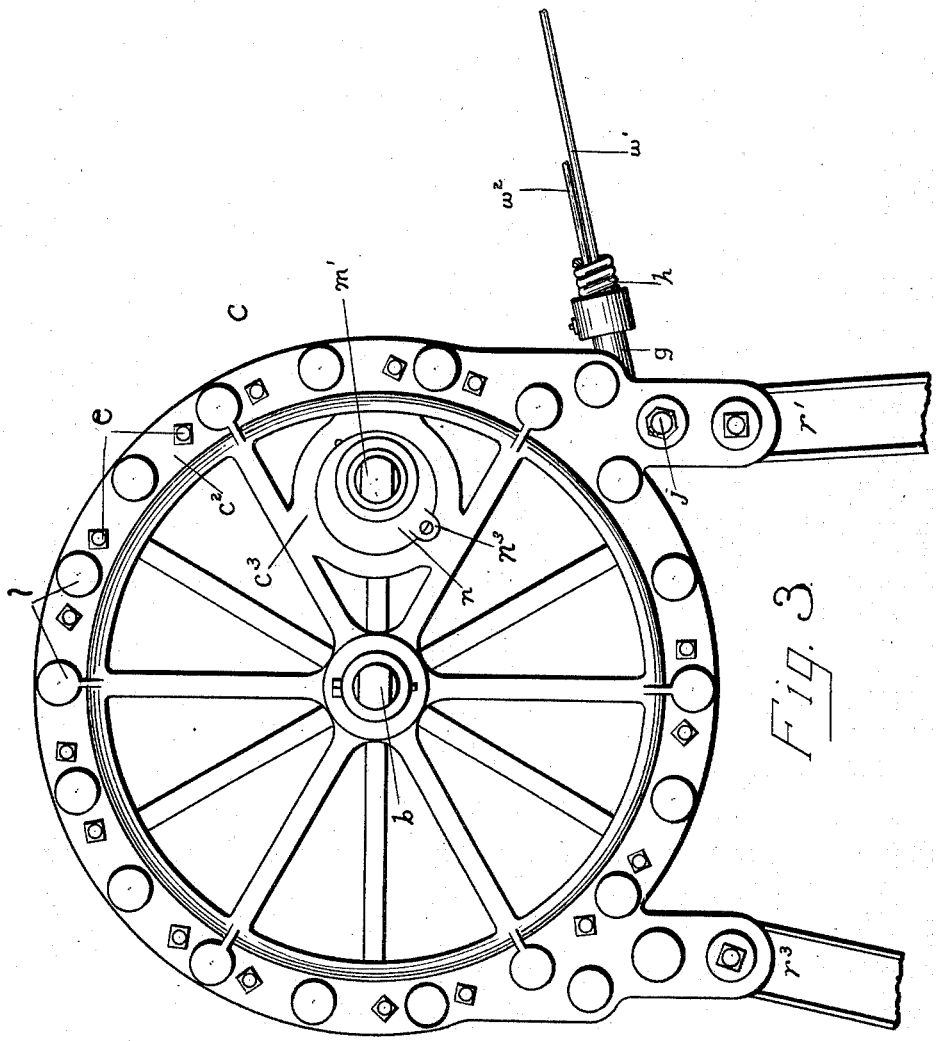
WITNESSES:
INVENTOR
George Fussell
BY
ATTORNEY

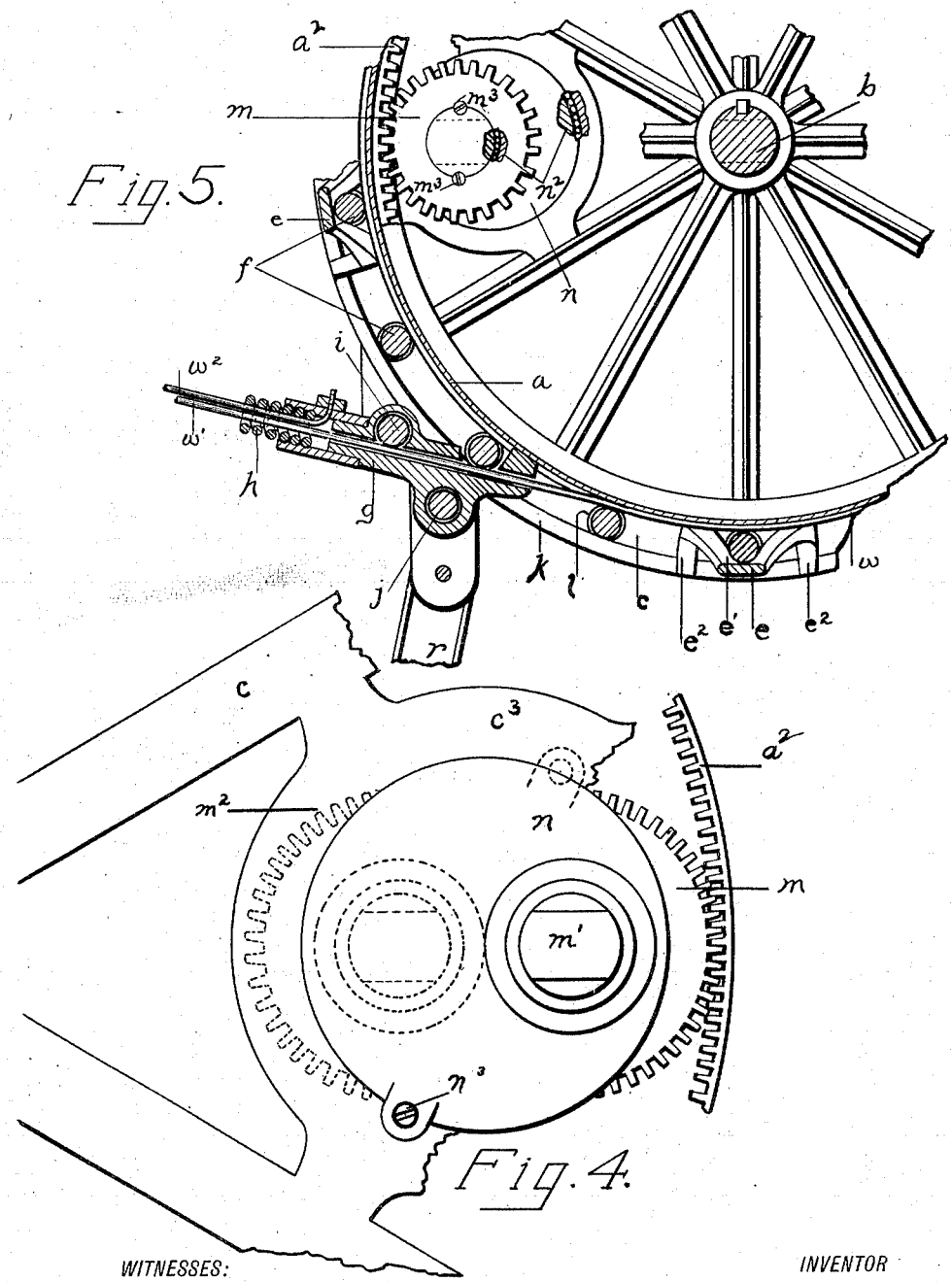

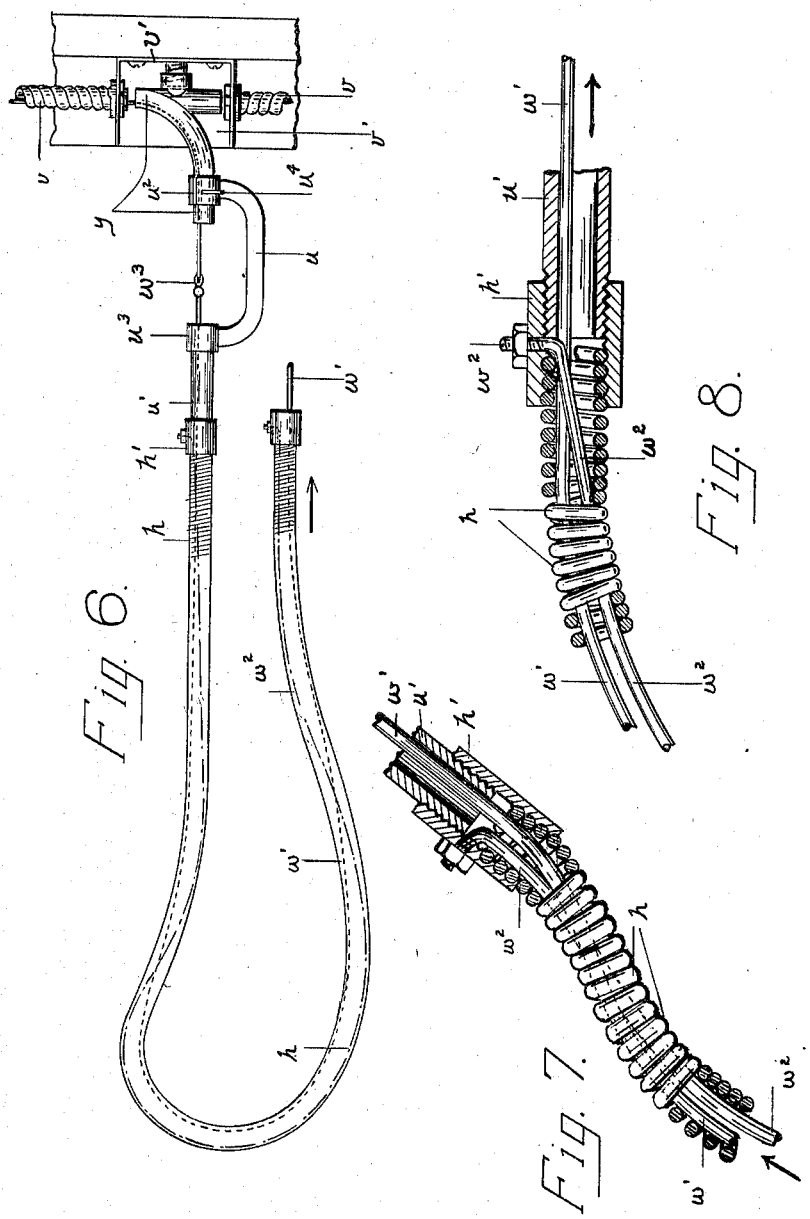

UNITED STATES PATENT OFFICE.

GEORGE FUSSELL, OF PORTLAND, OREGON, ASSIGNOR TO WILLIAM C. SCHMITT, OF PORTLAND, OREGON.

CONDUIT-WIRE-FISHING REEL.

1,096,618.   Specification of Letters Patent.   Patented May 12, 1914.

Application filed January 2, 1912. Serial No. 669,145.

*To all whom it may concern:*

Be it known that I, GEORGE FUSSELL, a citizen of the United States, and a resident of Portland, county of Multnomah, State of Oregon, have invented a new and useful Improvement in Conduit-Wire-Fishing Reels, of which the following is a specification.

My invention relates to "conduit fishing" devices, used for running an electric wire through conduits. As well known, the purpose of such devices is to facilitate the running of an electric wire through a conduit, by first driving a so called "fishing" wire through the conduit and then drawing the electric cable or wire through the conduit by the return movement of the fishing wire.

The object of my invention is to provide a simple and efficient device for the purpose mentioned.

My further object is to provide a device of sufficient strength to withstand the necessary strain, at the same time to keep down its weight so as to render the device portable and readily moved from place to place.

My further object is to adapt my device to be readily moved on its own supporting base for short distances.

My invention also embodies certain novel features which are hereinafter fully set forth.

In the drawings: Figure 1 is a perspective view of my reel, which is shown mounted on an adjustable carriage so as to make it convenient for moving the reel short distances on its own base; Fig. 2 is an elevation of the right side of my machine, with regard to Fig. 1, the view being partly in longitudinal section; the "fishing wire" also appears in this view, but is drawn on a relatively exaggerated scale, so as to be seen more clearly; Fig. 3 is a partial front elevation, illustrating supplementary means for facilitating the operation of my device when under heavy strain, by reason of pulling a long wire through a conduit or because of other difficulties; Fig. 4 is a diagrammatic fragmental view of details of said supplementary means; Fig. 5 is a fragmental section on line $x$—$x$ of Fig. 2, looking in the direction pointed by the arrow, parts of the drum of the reel being broken away; Fig. 6 is a detail of convenient clamping means provided by me for connecting the feed-pipe of my reel to the conduit; this view also showing, in dot-and-dash lines, a tension wire provided by me within said feed-pipe for restraining the feed-pipe against undue longitudinal expansion; and Figs. 7 and 8 are details illustrating the action of the tension wires, which action is also to be observed from Fig. 5.

My reel consists of a truck-frame, $r$, rotatably supporting a drum, $a$, made with a peripheral spiral groove, said drum being rigidly mounted on a shaft $b$, so as to rotate therewith, and said shaft being journaled in frame-sides, $c$, $c'$, supported on the truck-frame $r$. The extremities of the shaft $b$ are adapted to have a crank-handle affixed thereon. The drum is conveniently made of two drum-heads and a cylindrical shell, the latter being made with a peripheral spiral groove, as mentioned. The drum-head $a'$ is provided with internal gear teeth $a^2$, adapted to be thrown into mesh with a pinion $m$, (see Figs. 3, 4 and 5) journaled in an adjustable eccentric bearing $n$, adapted to be arranged to throw the pinion $m$ into and out of mesh. The pinion $m$ is rotated by placing the crank-handle $d$ on the squared projecting end of the stud-pin $m'$, and the power is applied to rotate the pinion $m$ instead of the shaft $b$, when it is convenient to increase the efficiency of the power applied at expense of speed, in order to overcome any abnormal resistance of the electric wire in being drawn through a long conduit. In Fig. 5 the hatched broken portions at $n^2$ illustrate anti-friction bearings.

The eccentric bearing, $n$, is rotatably journaled in the web $c^3$ of the frame side $c$, and is provided with a set-screw $n^3$ for locking it in the position to which adjusted. The inoperative position of the eccentric bearing $m$ is shown by the dotted outline $m^2$ in Fig. 4. The eccentric bearing is provided for the pinion $m$ so as to be able to throw the latter out of mesh when not to be used, and in so doing eliminating avoidable strain due to the meshing of said pinion with the internal gear-teeth $a^2$, when the power is directly applied to the shaft $b$.

The frame-sides, $c$, $c'$, are held spaced apart by a plurality of circumferentially distributed longitudinal spacing bars $e$, against the bifurcated ends $e'$ of which the frame sides are rigidly bolted. See Figs. 1, 2 and 5. Each member of such bifurcated ends $e'$ is formed with a lug $e^2$ (see Fig. 2)

provided for limiting the longitudinal movement of the rings $k$, $k'$ located interior of the frame sides $c$, $c'$.

The wire, $w$, is wound on the drum, $a$, and one end made fast to the latter, the other end $w'$ is led from the drum through a cored out traveling throat-block $g$ and a flexible feed-tube $h$, affixed to such throat-block, as shown in Fig. 5. Said throat-block is slidably mounted on the rod $i$, and its movement is accomplished by the rotation of the worm-screw $j$, with which a member of the throat-block is engaged. Said worm-screw $j$ is journaled in the frame-sides and is driven from the shaft $b$ by sprocket pinions, $o$ and $s$, and a sprocket chain $p$ (shown only in Fig. 2), the devices being arranged to cause the travel of the throat-block at such speed as to place it constantly opposite the point at which the wire $w$ is being coiled on or off the drum $a$. The rod, $i$, is made of sufficient strength to prevent any strain from being thrown on the worm-screw $j$. The rotation of the drum, $a$, forces the wire-end $w'$ through the throat-block $g$ and thence through the flexible feed-tube $h$ into the conduit $v$ and through the latter to its exit. The peripheral threads in the surface of the drum, $a$, prevent longitudinal movement of the wire coils or loops wound on the drum.

To prevent the unwinding of the coils of the wire $w$ from the drum $a$, by reflex expansion, I provide a series of retaining rollers $f$, bearing on the coils of wire seated in the peripheral groove of the drum. Said rollers $f$ are prevented from being laterally displaced by having their ends projecting into the recessed inner sides of the bosses, $l$, formed on the circumferential rim $c^2$ of the frame-sides $c$, $c'$ and the ends of said retaining rollers $f$ thrust against one or more balls placed in such recess. But the entire strain of holding the rollers on the coils of wire wound on the drum is borne by the rings $k$, $k'$, which are placed and revolve on the extremities of said retaining rollers $f$. The rings $k$, $k'$ are held against longitudinal displacement by the lugs $e^2$ on the spacing bars $e$, as shown in Figs. 1, 2 and 5, to which reference was already had above. In setting up this machine, the rings $k$, $k'$ are put in place on the retaining rollers $f$ before the two frame-sides $c$, $c'$ are bolted on the extremities of the spacing bars. In action the rotation of the drum, $a$, causes the rollers $f$ to rotate within the rings $k$, $k'$, and the latter are caused to move on the rollers $f$. The rollers and rings really act as roller bearings for each other. It will now be noted that the respective wire coils on the drum practically lie each in a sort of individual guide channel formed by the position of the parts described.

The flexible tube or guiding member $h$ for the wire end $w'$ is preferably made of heavy spirally coiled wire which possesses marked advantages over the ordinary flexible hose, commonly used for such purpose; for it offers less resistance to the passage of the fishing wire through it, since it will never form a kink or sharp angle.

In operating with my device, the outer end of the feed tube $h$ is conveniently connected with the inlet end of the conduit by means of a clamp, consisting of a yoke bar $u$, provided at its extremities with knuckles $u^2$, $u^3$. See Fig. 6. A nipple $u'$ is threaded into the knuckle $u^3$ and into the collar $h'$, rigidly attached to the feed tube $h$. Various forms of guiding tube, $y$, may be fastened in the knuckle $u^3$ by inserting the wedge $u^4$, that shown in Fig. 6 being adapted to fit a wall box $v'$, in which the conduit, $v$, usually enters at the top and bottom, but, whenever practical, the conduit may be fastened directly into the knuckle $u^2$. However, the particular means employed for connecting the feed tube or member $h$ with the conduit is, of course, immaterial.

A tension wire $w^2$ is introduced in the feed tube, limiting the endwise expansion of the latter, said tension wire being inoperative during the pulling operation, as shown in dot-and-dash lines in Fig. 6. In the latter figure the fishing wire $w'$, shown in dotted lines, is being drawn in the direction indicated by the arrow, pulling the electric cable of wire through the conduit. Figs. 7 and 8 illustrate the position assumed by the tension wire $w^2$ during the driving operation of my device, in which the fishing wire $w$ is thrust through the conduit, and would follow the outside of the curves in the feed tube $h$, tending to expand the latter. The tension wire $w^2$ is thus drawn to the inner side of the curves, limiting said expansion of the feed tube.

The wire end $w'$ comprises a ball-and-eyelet $w^3$, to which the electric cable or wire is to be attached, and which serves to guide the wire end $w^3$ over irregularities and around bends in the conduit $v$.

The supporting frame of my device is preferably made collapsible, so that it can be used as a truck for transporting my reel from place to place. This frame consists of the parallel front legs $r'$, $r'$, horizontal member $r^{11}$, and the rear legs $r^3$, $r^3$. See Fig. 1. The front legs, $r'$, $r'$, support the foremost portion of my device, being pintled on the tie rod $r^8$; the cross-bracing $r^9$ and the tie-rod $r^{10}$, between these front legs, providing a rigid construction. In the lower foremost portions of the front legs, $r'$, $r'$, is journaled the axle $r^5$, bearing the wheels $r^2$. The rear legs $r^3$ support the rear portion of my device, being connected to the latter by a removable tie-rod $r^4$, and they are braced across by the cross-bracing $r^{13}$ and tie-rod $r^{14}$. Said rear legs are pivotally connected to the horizontal legs $r^{11}$, of the angular front legs $r'$, by the tie rod $r^{12}$, the horizontal legs being spaced apart by the crossbracing $r^{18}$. The rear legs $r^3$ are provided with an extension leg $r^{15}$, as shown in Fig. 1, and the horizontal legs $r^{11}$ contain the bosses $r^{16}$. When it is desired to move the device some distance, the tie-rod $r^4$ is removed and the rear legs $r^3$ are rotated about the tie rod $r^{12}$. When the lower portions $r^{17}$ of such legs have assumed positions adjacent to the bosses $r^{16}$ the tie rod $r^4$ is inserted between these parts, thereby holding them firmly in position. The rear legs will then have assumed the position shown by the dotted lines $r^6$ of Fig. 1. The frame sides, $c$, and the parts contained between them, may then be rotated about the tie-rod $r^8$, till they rest in the angular supports made by the front legs $r'$ and the horizontal members $r^{11}$, as shown by the dotted lines $r^7$. When the device has been adjusted in this manner, the rear legs $r^3$ may be used as handles, and the truck thus formed trundled along on the wheels $r^2$.

I claim:

1. In a conduit wire fishing device, the combination of a frame; a drum journaled in the frame; a fishing wire wound on the drum having its inner end fastened thereto and its coils arranged side by side; a traveling guiding device through which the uncoiled end of the wire extends; means restraining said wire except its uncoiled portion from uncoiling off or moving laterally on the drum; means whereby the guiding device is caused to follow the relative movement of the uncoiled wire portion with respect to the drum; and means for guiding the uncoiled portion of the wire from said guiding device.

2. In a conduit wire fishing device, the combination of a frame; a drum journaled in the frame; a fishing wire wound on the drum having its inner end fastened thereto and its coils arranged side by side; a traveling throat-block, longitudinally movable exterior of the drum, through which the uncoiled end of the wire extends; means restraining said wire except its uncoiled portion from uncoiling off or moving laterally on the drum; means whereby the throat block is caused to follow the relative movement of the uncoiled wire portion with respect to the drum; and means for guiding the uncoiled portion of the wire from said throat block.

3. In a conduit wire fishing reel, the combination of a frame, a drum journaled in the frame, a fishing wire wound on such drum; a plurality of restraining rollers rotatably supported circumferentially and longitudinally of the drum, said rollers arranged to bear on the wire coils on the drum; loose rings encompassing and revoluble on the extremity of said restraining rollers; and means for holding the rings against shifting longitudinally.

4. In a conduit wire fishing reel, the combination of a frame comprising sides, longitudinal spacing bars arranged circumferentially between the sides, said spacing bars formed at their extremities with lugs spaced from the rims of the sides; a drum journaled between the sides of the frame; a fishing wire wound on such drum; a plurality of restraining rollers rotatably supported circumferentially and longitudinally of the drum, said rollers arranged to bear on the wire coils on the drum; loose rings encompassing and revoluble on the extremity of said restraining rollers; and said rings located between the rim of the frame sides and the shoulders of the spacing bars.

GEORGE FUSSELL.

Witnesses:
 CECIL LONG,
 W. REIN COOP.

---

Copies of this patent may be obtained for five cents each, by addressing the "Commissioner of Patents, Washington, D. C."